(12) United States Patent
Lee et al.

(10) Patent No.: US 12,082,151 B2
(45) Date of Patent: *Sep. 3, 2024

(54) TIMING ADVANCE COMMAND FOR UPLINK TRANSMISSION

(71) Applicant: LG ELECTRONICS INC., Seoul (KR)

(72) Inventors: Youngdae Lee, Seoul (KR); Hyunjung Choe, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/895,800

(22) Filed: Aug. 25, 2022

(65) Prior Publication Data

US 2022/0417901 A1 Dec. 29, 2022

Related U.S. Application Data

(63) Continuation of application No. 17/081,160, filed on Oct. 27, 2020, now Pat. No. 11,463,987, which is a continuation of application No. 16/585,913, filed on Sep. 27, 2019, now Pat. No. 10,856,257.

(30) Foreign Application Priority Data

Sep. 28, 2018 (KR) .......................... 10-2018-0115552

(51) Int. Cl.
*H04W 68/02* (2009.01)
*H04W 56/00* (2009.01)
*H04W 68/00* (2009.01)
*H04W 74/08* (2024.01)
*H04W 74/0833* (2024.01)
*H04W 76/27* (2018.01)

(52) U.S. Cl.
CPC ....... *H04W 68/02* (2013.01); *H04W 74/0833* (2013.01); *H04W 76/27* (2018.02)

(58) Field of Classification Search
CPC . H04W 68/02; H04W 74/0833; H04W 76/27; H04W 56/0045; H04W 68/00
USPC ...................................... 455/414.3
See application file for complete search history.

(56) References Cited

U.S. PATENT DOCUMENTS

| | | | |
|---|---|---|---|
| 10,856,257 B2* | 12/2020 | Lee ........ | H04W 68/02 |
| 11,463,987 B2* | 10/2022 | Lee ........ | H04W 68/02 |
| 2018/0206262 A1* | 7/2018 | Cao ........ | H04W 72/1268 |
| 2018/0213575 A1 | 7/2018 | Chen ........ | H04W 76/27 |
| 2018/0295543 A1 | 10/2018 | Gunnarsson ........ | H04W 16/28 |
| 2018/0324635 A1 | 11/2018 | Babaei ........ | H04W 74/0891 |
| 2018/0376422 A1 | 12/2018 | Shu ........ | H04W 52/0235 |
| 2019/0014512 A1* | 1/2019 | Rune ........ | H04W 36/08 |
| 2019/0141722 A1 | 5/2019 | Nayeb Nazar ........ | H04L 5/0053 |
| 2019/0289660 A1* | 9/2019 | Yi ........ | H04W 74/0833 |
| 2019/0313443 A1 | 10/2019 | Li ........ | H04W 74/004 |
| 2020/0068619 A1 | 2/2020 | Kim ........ | H04W 74/004 |

(Continued)

*Primary Examiner* — Inder P Mehra
(74) *Attorney, Agent, or Firm* — BRYAN CAVE LEIGHTON PAISNER LLP

(57) ABSTRACT

Provided are a method for skipping contention resolution. According to an embodiment of the present disclosure, the method includes leaving radio resource control (RRC) connected state, while leaving RRC connected state, receiving information on timing advance in a paging occasion, adapting the timing advance and performing transmission based on the adapted timing advance.

16 Claims, 12 Drawing Sheets

(56) References Cited

U.S. PATENT DOCUMENTS

2020/0288531 A1\* 9/2020 Iyer .......................... H04L 1/18
2022/0322484 A1\* 10/2022 Babaei .................. H04W 72/23

\* cited by examiner

TIMING ADVANCE COMMAND FOR UPLINK TRANSMISSION

CROSS-REFERENCE TO RELATED APPLICATIONS

Pursuant to 35 U.S.C. § 119 (e), this application is a continuation application of U.S. patent application Ser. No. 17/081,160, filed on Oct. 27, 2020, which is a continuation application of U.S. patent application Ser. No. 16/585,913, filed on Sep. 27, 2019, now U.S. Pat. No. 10,856,257, which claims the benefit of Korean Patent Application No. 10-2018-0115552, filed on Sep. 28, 2018, the contents of which are all hereby incorporated by reference herein in their entirety.

TECHNICAL FIELD

The present disclosure relates to timing advance.

BACKGROUND ART

Efforts have been made to develop an improved 5th-generation (5G) communication system or a pre-5G communication system in order to satisfy a growing demand on radio data traffic after commercialization of a 4th-generation (4G) communication system. A standardization act for a 5G mobile communication standard work has been formally started in 3GPP, and there is ongoing discussion in a standardization working group under a tentative name of a new radio access (NR).

Meanwhile, an upper layer protocol defines a protocol state to consistently manage an operational state of a user equipment (UE), and indicates a function and procedure of the UE in detail. In the discussion on the NR standardization, an RRC state is discussed such that an RRC_CONNECTED state and an RRC_IDLE state are basically defined, and an RRC_INACTIVE state is additionally introduced.

DISCLOSURE

Technical Problem

According to the prior art, UE may transmit data in RRC_IDLE and/or RRC_INACTIVE. In this case, the UE may be configured with configured grant to transmit user data in RRC_IDLE and/or RRC_INACTIVE. However, the configured grant may be valid only when uplink timing is aligned with the network. That is, if the uplink timing is not aligned with the network, the configured grant cannot be used.

Technical Solution

According to an embodiment of the present disclosure, a method performed by a wireless device in a wireless communication system is provided. The method may comprise leaving radio resource control (RRC) connected state, while leaving RRC connected state: receiving information on timing advance in a paging occasion, adapting the timing advance; and performing transmission based on the adapted timing advance.

Advantageous Effects

The present disclosure can have various advantageous effects.

For example, the UE may utilize previous configured grant continuously, by updating timing advance while staying in RRC idle or RRC inactive state.

For example, the UE may continuously align the uplink timing with the network based on Timing Advance Command received periodically via Paging. The configured grant can be used continuously, and data transmission with the configured grant can be continued as well.

For example, it may reduce the power consumption by configuring new configured grant, because new configured grant is not needed.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DESCRIPTION OF EXEMPLARY EMBODIMENTS

Figure 1:
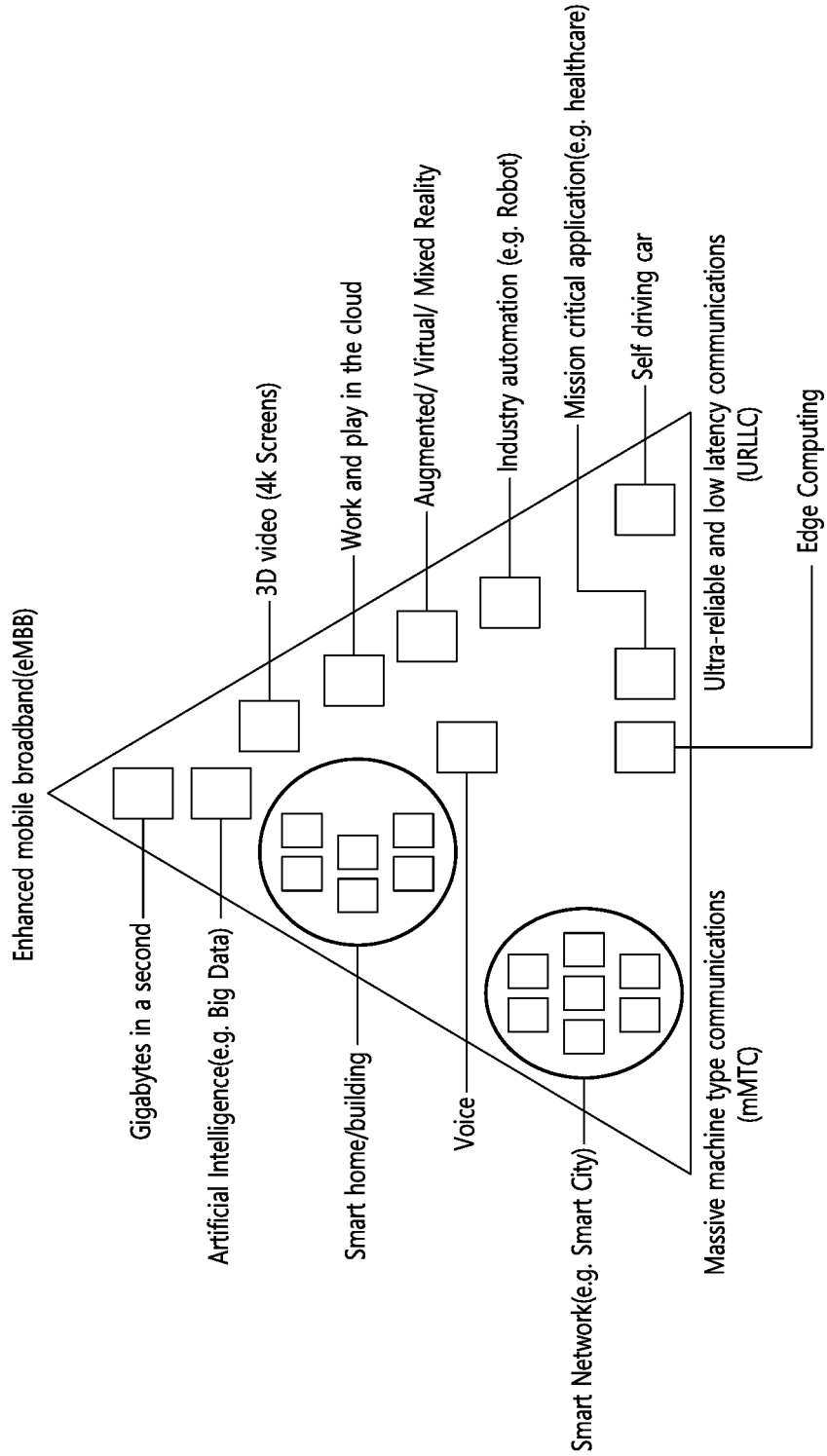
FIG. 1 shows examples of 5G usage scenarios to which the technical features of the present disclosure can be applied.

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (UL). For example, only OFDMA may be used for DL and only SC-FDMA may be used for UL. Alternatively, OFDMA and SC-FDMA may be used for DL and/or UL.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A, B, C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

FIG. 1 shows examples of 5G usage scenarios to which the technical features of the present disclosure can be applied.

The 5G usage scenarios shown in FIG. 1 are only exemplary, and the technical features of the present disclosure can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, internet-of-things (IoT) devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time high-definition (HD) video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

Figure 2:
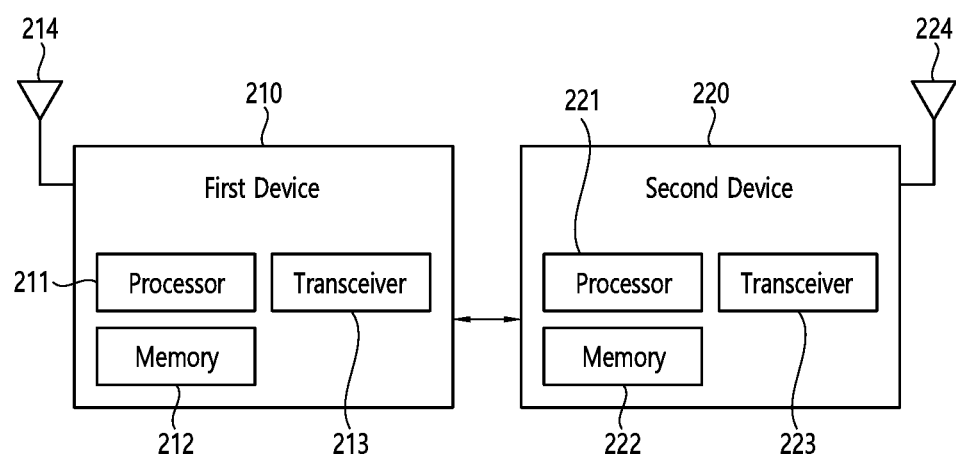
FIG. 2 shows an example of a wireless communication system to which the technical features of the present disclosure can be applied.

FIG. 2 shows an example of a wireless communication system to which the technical features of the present disclosure can be applied.

Referring to FIG. 2, the wireless communication system may include a first device 210 and a second device 220.

The first device 210 includes a base station, a network node, a transmitting UE, a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an AR device, a VR device, a mixed reality (MR) device, a hologram device, a public safety device, an MTC device, an IoT device, a medical device, a fin-tech device (or, a financial device), a security device, a climate/environmental device, a device related to 5G services, or a device related to the fourth industrial revolution.

The second device 220 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g. a smartwatch, a smart glass, a head mounted display (HMD)). For example, the HMD may be a display device worn on the head. For example, the HMD may be used to implement AR, VR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body. For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, a security device may be a device installed to prevent the risk that may occur and to maintain safety. For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

The first device 210 may include at least one or more processors, such as a processor 211, at least one memory, such as a memory 212, and at least one transceiver, such as a transceiver 213. The processor 211 may perform the functions, procedures, and/or methods of the present disclosure described below. The processor 211 may perform one or more protocols. For example, the processor 211 may perform one or more layers of the air interface protocol. The memory 212 is connected to the processor 211 and may store various types of information and/or instructions. The transceiver 213 is connected to the processor 211 and may be controlled to transmit and receive wireless signals.

The second device 220 may include at least one or more processors, such as a processor 221, at least one memory, such as a memory 222, and at least one transceiver, such as a transceiver 223. The processor 221 may perform the functions, procedures, and/or methods of the present disclosure described below. The processor 221 may perform one or more protocols. For example, the processor 221 may perform one or more layers of the air interface protocol. The memory 222 is connected to the processor 221 and may store various types of information and/or instructions. The transceiver 223 is connected to the processor 221 and may be controlled to transmit and receive wireless signals.

The memory 212, 222 may be connected internally or externally to the processor 211, 212, or may be connected to other processors via a variety of technologies such as wired or wireless connections.

The first device 210 and/or the second device 220 may have more than one antenna. For example, antenna 214 and/or antenna 224 may be configured to transmit and receive wireless signals.

Figure 3:
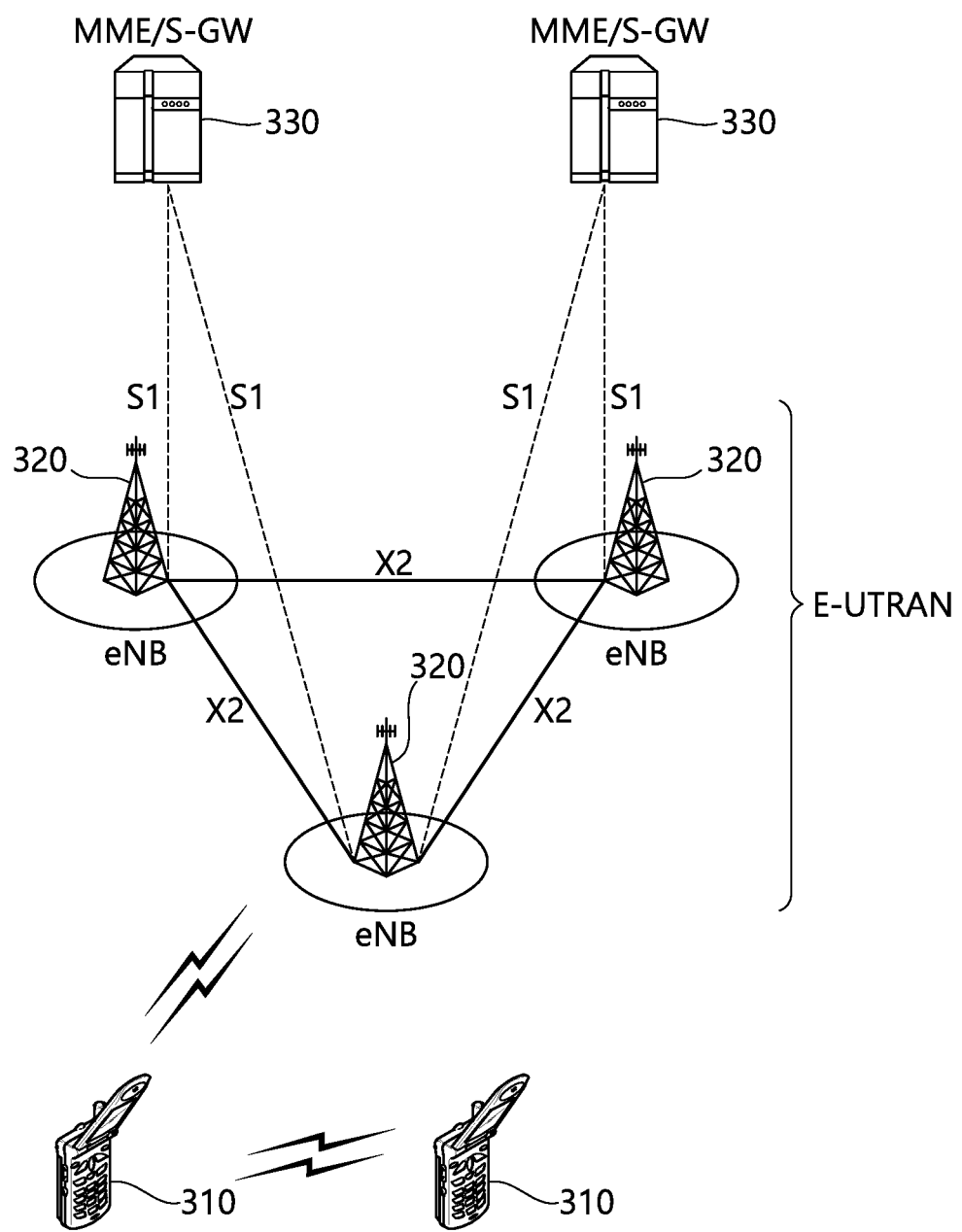
FIG. 3 shows an example of a wireless communication system to which the technical features of the present disclosure can be applied.

FIG. 3 shows an example of a wireless communication system to which the technical features of the present disclosure can be applied.

Specifically, FIG. 3 shows a system architecture based on an evolved-UMTS terrestrial radio access network (E-UTRAN). The aforementioned LTE is a part of an evolved-UTMS (e-UMTS) using the E-UTRAN.

Referring to FIG. 3, the wireless communication system includes one or more user equipment (UE) 310, an E-UTRAN and an evolved packet core (EPC). The UE 310 refers to a communication equipment carried by a user. The UE 310 may be fixed or mobile. The UE 310 may be referred to as another terminology, such as a mobile station (MS), a user terminal (UT), a subscriber station (SS), a wireless device, etc.

The E-UTRAN consists of one or more evolved NodeB (eNB) 320. The eNB 320 provides the E-UTRA user plane and control plane protocol terminations towards the UE 10. The eNB 320 is generally a fixed station that communicates with the UE 310. The eNB 320 hosts the functions, such as inter-cell radio resource management (RRM), radio bearer (RB) control, connection mobility control, radio admission control, measurement configuration/provision, dynamic resource allocation (scheduler), etc. The eNB 320 may be referred to as another terminology, such as a base station (BS), a base transceiver system (BTS), an access point (AP), etc.

A downlink (DL) denotes communication from the eNB 320 to the UE 310. An uplink (UL) denotes communication from the UE 310 to the eNB 320. A sidelink (SL) denotes communication between the UEs 310. In the DL, a transmitter may be a part of the eNB 320, and a receiver may be a part of the UE 310. In the UL, the transmitter may be a part of the UE 310, and the receiver may be a part of the eNB 320. In the SL, the transmitter and receiver may be a part of the UE 310.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 330 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 310 is connected to the eNB 320 by means of the Uu interface. The UEs 310 are interconnected with each other by means of the PC5 interface. The eNBs 320 are interconnected with each other by means of the X2 interface. The eNBs 320 are also connected by means of the S1 interface to the EPC, more specifically to the MME by means of the S1-MME interface and to the S-GW by means of the S1-U interface. The S1 interface supports a many-to-many relation between MMEs/S-GWs and eNBs.

Figure 4:
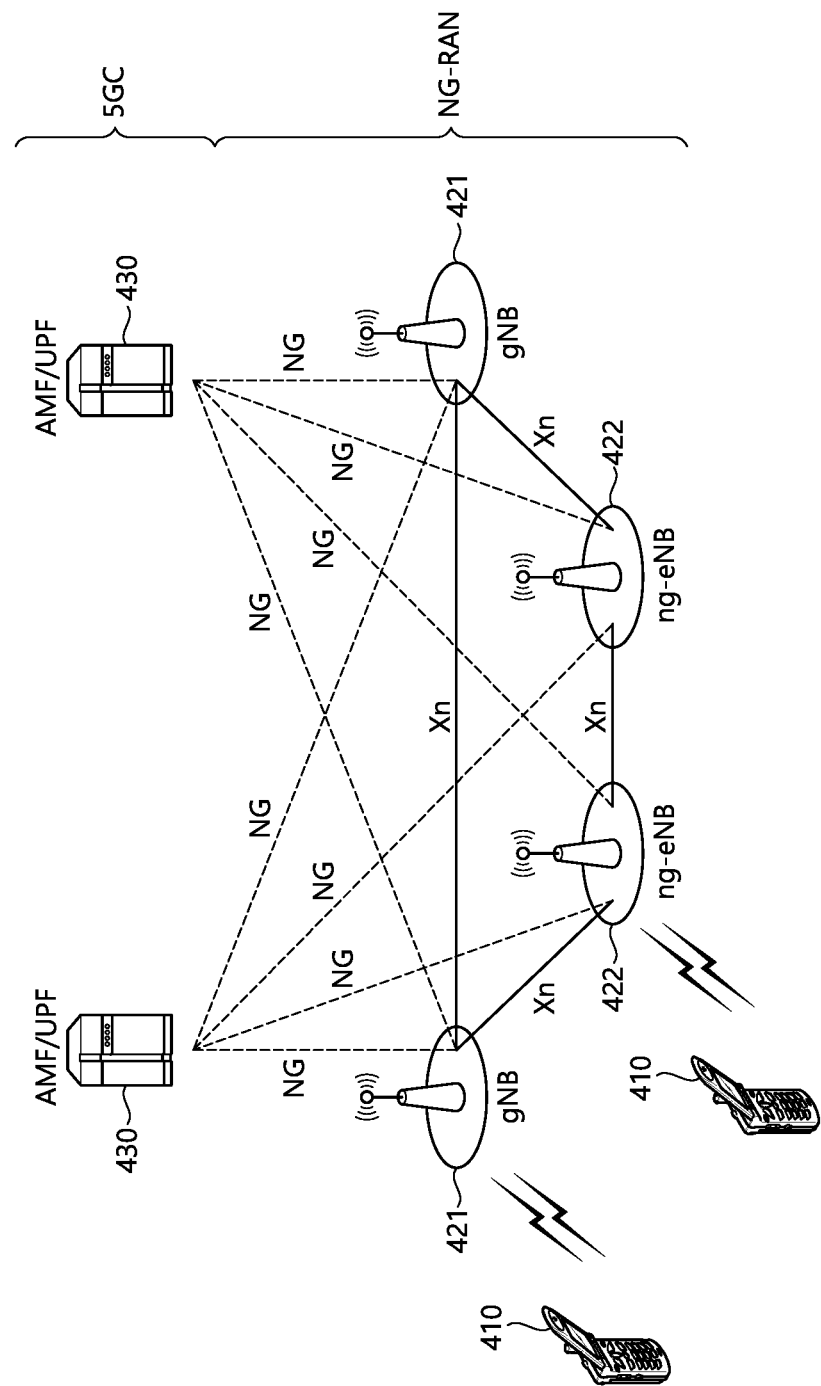
FIG. 4 shows another example of a wireless communication system to which the technical features of the present disclosure can be applied.

FIG. 4 shows another example of a wireless communication system to which the technical features of the present disclosure can be applied.

Specifically, FIG. 4 shows a system architecture based on a 5G NR. The entity used in the 5G NR (hereinafter, simply referred to as "NR") may absorb some or all of the functions of the entities introduced in FIG. 3 (e.g. eNB, MME, S-GW). The entity used in the NR may be identified by the name "NG" for distinction from the LTE/LTE-A.

Referring to FIG. 4, the wireless communication system includes one or more UE 410, a next-generation RAN (NG-RAN) and a 5th generation core network (5GC). The NG-RAN consists of at least one NG-RAN node. The NG-RAN node is an entity corresponding to the eNB 320 shown in FIG. 3. The NG-RAN node consists of at least one gNB 421 and/or at least one ng-eNB 422. The gNB 421 provides NR user plane and control plane protocol terminations towards the UE 410. The ng-eNB 422 provides E-UTRA user plane and control plane protocol terminations towards the UE 410.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs 421 and ng-eNBs 422 are interconnected with each other by means of the Xn interface. The gNBs 421 and ng-eNBs 422 are also connected by means of the NG interfaces to the 5GC, more specifically to the AMF by means of the NG-C interface and to the UPF by means of the NG-U interface.

A protocol structure between network entities described above is described. On the system of FIG. 3 and/or FIG. 4, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 5:
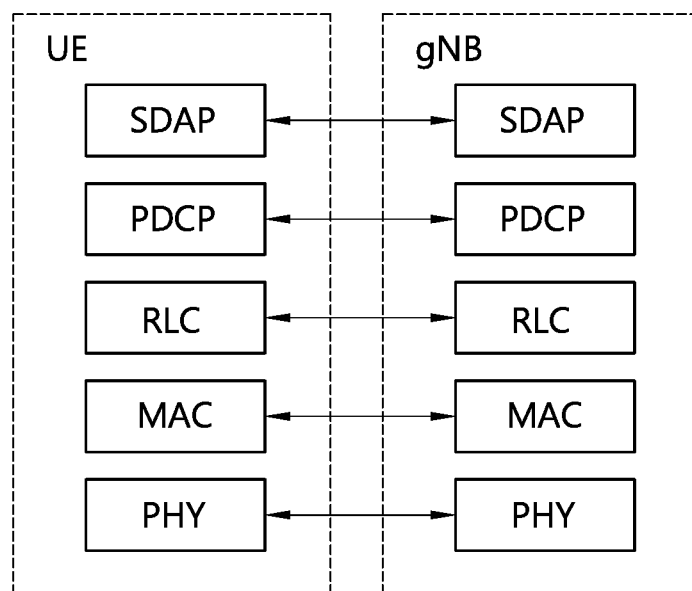
FIG. 5 shows a block diagram of a user plane protocol stack to which the technical features of the present disclosure can be applied.
Figure 6:
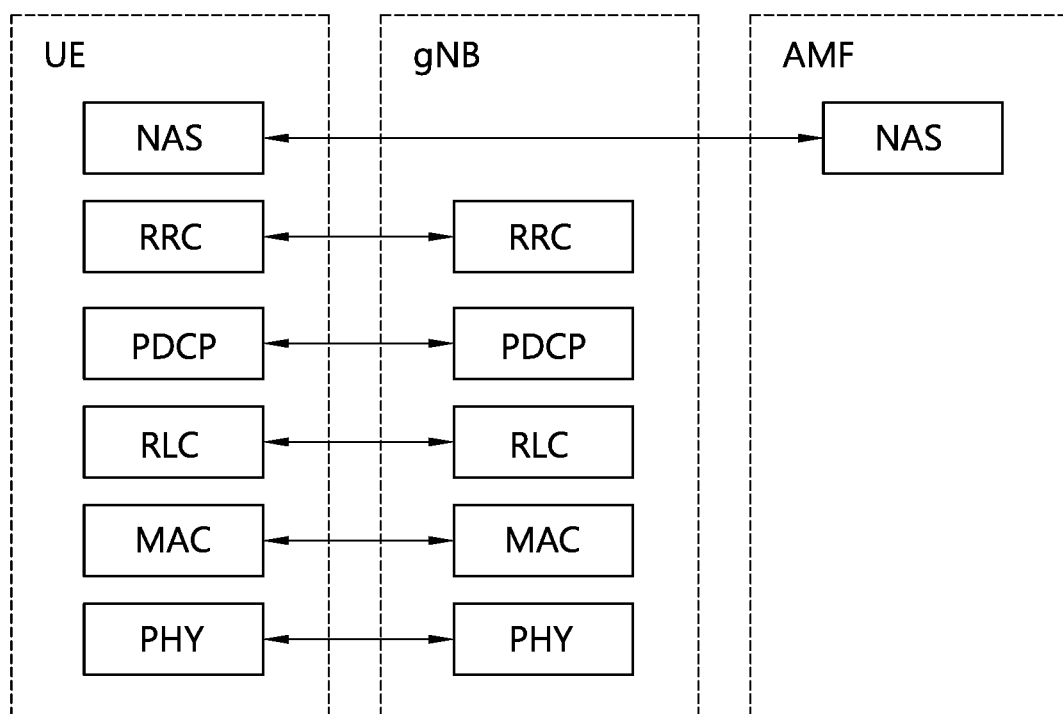
FIG. 6 shows a block diagram of a control plane protocol stack to which the technical features of the present disclosure can be applied.

FIG. 5 shows a block diagram of a user plane protocol stack to which the technical features of the present disclosure can be applied. FIG. 6 shows a block diagram of a control plane protocol stack to which the technical features of the present disclosure can be applied.

The user/control plane protocol stacks shown in FIG. 5 and FIG. 6 are used in NR. However, user/control plane protocol stacks shown in FIG. 5 and FIG. 6 may be used in LTE/LTE-A without loss of generality, by replacing gNB/AMF with eNB/MME.

Referring to FIG. 5 and FIG. 6, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/de-multiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

DL Assignment reception for DL-SCH data transfer is described.

Downlink assignments transmitted on the PDCCH indicate if there is a transmission on a DL-SCH for a particular MAC entity and provide the relevant HARQ information.

When the MAC entity has a C-RNTI, Semi-Persistent Scheduling C-RNTI, or Temporary C-RNTI, the MAC entity shall for each TTI during which it monitors PDCCH and for each Serving Cell:

if a downlink assignment for this TTI and this Serving Cell has been received on the PDCCH for the MAC entity's C-RNTI, or Temporary C-RNTI:
  if this is the first downlink assignment for this Temporary C-RNTI:
  consider the NDI to have been toggled.
  if the downlink assignment is for the MAC entity's C-RNTI and if the previous downlink assignment indicated to the HARQ entity of the same HARQ process was either a downlink assignment received for the MAC entity's Semi-Persistent Scheduling C-RNTI or a configured downlink assignment:
  consider the NDI to have been toggled regardless of the value of the NDI.
  indicate the presence of a downlink assignment and deliver the associated HARQ information to the HARQ entity for this TTI.
else, if this Serving Cell is the SpCell and a downlink assignment for this TTI has been received for the SpCell on the PDCCH of the SpCell for the MAC entity's Semi-Persistent Scheduling C-RNTI:
  if the NDI in the received HARQ information is 1:
  consider the NDI not to have been toggled;
  indicate the presence of a downlink assignment and deliver the associated HARQ information to the HARQ entity for this TTI.
  else, if the NDI in the received HARQ information is 0:
  if PDCCH contents indicate SPS release:
  clear the configured downlink assignment (if any);
  if the timeAlignmentTimer associated with the pTAG is running
  indicate a positive acknowledgement for the downlink SPS release to the physical layer.
  else:
  store the downlink assignment and the associated HARQ information as configured downlink assignment;
  initialise (if not active) or re-initialise (if already active) the configured downlink assignment to start in this TTI and to recur;
  set the HARQ Process ID to the HARQ Process ID associated with this TTI;
  consider the NDI bit to have been toggled;
  indicate the presence of a configured downlink assignment and deliver the stored HARQ information to the HARQ entity for this TTI.

UL Grant reception for UL-SCH data transfer is described.

In order to transmit on the UL-SCH the MAC entity must have a valid uplink grant (except for non-adaptive HARQ retransmissions) which it may receive dynamically on the PDCCH or in a Random Access Response or which may be configured semi-persistently or preallocated by RRC. To perform requested transmissions, the MAC layer receives HARQ information from lower layers. When the physical layer is configured for uplink spatial multiplexing, the MAC layer can receive up to two grants (one per HARQ process) for the same TTI from lower layers.

If the MAC entity has a C-RNTI, a Semi-Persistent Scheduling C-RNTI, a UL Semi-Persistent Scheduling V-RNTI, or a Temporary C-RNTI, the MAC entity shall for each TTI and for each Serving Cell belonging to a TAG that has a running timeAlignmentTimer and for each grant received for this TTI and for each SPS configuration that is indicated by the PDCCH addressed to UL Semi-Persistent Scheduling V-RNTI:
  if an uplink grant for this TTI and this Serving Cell has been received on the PDCCH for the MAC entity's C-RNTI or Temporary C-RNTI; or
  if an uplink grant for this TTI has been received in a Random Access Response:
  if the uplink grant is for MAC entity's C-RNTI and if the previous uplink grant delivered to the HARQ entity for the same HARQ process was either an uplink grant received for the MAC entity's Semi-Persistent Scheduling C-RNTI, for the MAC entity's UL Semi-Persistent Scheduling V-RNTI, or a configured uplink grant:
    consider the NDI to have been toggled for the corresponding HARQ process regardless of the value of the NDI.
    deliver the uplink grant and the associated HARQ information to the HARQ entity for this TTI.
  else, if this Serving Cell is the SpCell and if an uplink grant for this TTI has been received for the SpCell on the PDCCH of the SpCell for the MAC entity's Semi-Persistent Scheduling C-RNTI or for the MAC entity's UL Semi-Persistent Scheduling V-RNTI:
  if the NDI in the received HARQ information is 1:
  consider the NDI for the corresponding HARQ process not to have been toggled;
  deliver the uplink grant and the associated HARQ information to the HARQ entity for this TTI.
  else if the NDI in the received HARQ information is 0:
  if PDCCH contents indicate SPS release:
  if the MAC entity is configured with skipUplinkTxSPS:
  trigger an SPS confirmation;
  if an uplink grant for this TTI has been configured:
  consider the NDI bit for the corresponding HARQ process to have been toggled;
  deliver the configured uplink grant and the associated HARQ information to the HARQ entity for this TTI;
  else:
  clear the corresponding configured uplink grant (if any).
  else:
  if the MAC entity is configured with skipUplinkTxSPS:
  trigger an SPS confirmation;
  store the uplink grant and the associated HARQ information as configured uplink grant;
  initialise (if not active) or re-initialise (if already active) the configured uplink grant to start in this TTI and to recur;
  if UL HARQ operation is asynchronous, set the HARQ Process ID to the HARQ Process ID associated with this TTI;
  consider the NDI bit for the corresponding HARQ process to have been toggled;
  deliver the configured uplink grant and the associated HARQ information to the HARQ entity for this TTI.
Semi-Persistent Scheduling is described.
When Semi-Persistent Scheduling is enabled by RRC, the following information is provided:
  Semi-Persistent Scheduling C-RNTI or UL Semi-Persistent Scheduling V-RNTI;
  Uplink Semi-Persistent Scheduling interval semiPersistSchedIntervalUL and number of empty transmissions before implicit release implicitReleaseAfter, if Semi-Persistent Scheduling with Semi-Persistent Scheduling C-RNTI is enabled for the uplink;
  Uplink Semi-Persistent Scheduling interval semiPersistSchedIntervalUL and number of empty transmissions before implicit release implicitReleaseAfter for each SPS configuration, if Semi-Persistent Scheduling with UL Semi-Persistent Scheduling V-RNTI is enabled for the uplink;
  Whether twoIntervalsConfig is enabled or disabled for uplink, only for TDD;
  Downlink Semi-Persistent Scheduling interval semiPersistSchedIntervalDL and number of configured HARQ processes for Semi-Persistent Scheduling numberOfConfSPS-Processes, if Semi-Persistent Scheduling is enabled for the downlink;
When Semi-Persistent Scheduling for uplink or downlink is disabled by RRC, the corresponding configured grant or configured assignment shall be discarded.

Semi-Persistent Scheduling is supported on the SpCell only.

Semi-Persistent Scheduling is not supported for RN communication with the E-UTRAN in combination with an RN subframe configuration.

NOTE: When eIMTA is configured for the SpCell, if a configured uplink grant or a configured downlink assignment occurs on a subframe that can be reconfigured through eIMTA L1 signalling, then the UE behaviour is left unspecified.

In case of Downlink, after a Semi-Persistent downlink assignment is configured, the MAC entity shall consider sequentially that the Nth assignment occurs in the subframe for which:
  (10*SFN+subframe)=[(10*SFNstart time+subframestart time)+N*semiPersistSchedIntervalDL] modulo 10240.
  Where SFNstart time and subframestart time are the SFN and subframe, respectively, at the time the configured downlink assignment were (re-)initialised.

For BL UEs or UEs in enhanced coverage SFNstart time and subframestart time refer to SFN and subframe of the first transmission of PDSCH where configured downlink assignment was (re-)initialized.

In case of Uplink, after a Semi-Persistent Scheduling uplink grant is configured, the MAC entity shall:
  if twoIntervalsConfig is enabled by upper layer:
  set the Subframe_Offset according to Table 7.4-1.
  else:
  set Subframe_Offset to 0.
  consider sequentially that the Nth grant occurs in the subframe for which:
  (10*SFN+subframe)=[(10*SFNstart time+subframestart time)+N*semiPersistSchedIntervalUL+Subframe_Offset*(N modulo 2)] modulo 10240.
  Where SFNstart time and subframestart time are the SFN and subframe, respectively, at the time the configured uplink grant were (re-)initialised.

For TDD, the MAC entity is configured with semiPersistSchedIntervalUL shorter than 10 subframes, the Nth grant shall be ignored if it occurs in a downlink subframe or a special subframe.

If the MAC entity is not configured with skipUplinkTxSPS, the MAC entity shall clear the configured uplink grant immediately after implicitReleaseAfter number of consecutive new MAC PDUs each containing zero MAC SDUs have been provided by the Multiplexing and Assembly entity, on the Semi-Persistent Scheduling resource.

If SPS confirmation has been triggered and not cancelled:
if the MAC entity has UL resources allocated for new transmission for this TTI:
instruct the Multiplexing and Assembly procedure to generate an SPS confirmation MAC Control Element;
cancel the triggered SPS confirmation.

The MAC entity shall clear the configured uplink grant immediately after first transmission of SPS confirmation MAC Control Element triggered by the SPS release.

NOTE: Retransmissions for Semi-Persistent Scheduling can continue after clearing the configured uplink grant.

For BL UEs or UEs in enhanced coverage SFNstart time and subframestart time refer to SFN and subframe of the first transmission of PUSCH where configured uplink grant was (re-)initialized.

In the event of a resource conflict between multiple UL SPS configurations configured with Uplink Semi-Persistent Scheduling V-RNTI, the UE behaviour is undefined.

NR supports multiple numerology (or, subcarrier spacing (SCS)) to support various 5G services. For example, when the SCS is 15 kHz, wide area in traditional cellular bands may be supported. When the SCS is 30 kHz/60 kHz, dense-urban, lower latency and wider carrier bandwidth may be supported. When the SCS is 60 kHz or higher, a bandwidth greater than 24.25 GHz may be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Early data transmission (EDT) is described.

With the introduction of the new RRC state (i.e., RRC-INACTIVE state) in NR, the UE may incur minimum signaling, minimize power consumption, minimize resource costs in the network. In order to support this concept in NR, the UE may also be able to transmit the data without state transition from the RRC-INACTIVE to the RRC-CONNECTED. Early data transmission (EDT) refers to the operation of transmitting data before the RRC connection setup is completed, if the size of the data to be transmitted is small. In other words, according to the EDT, data transmission is allowed even when the UE is not in the RRC connection state.

EDT allows one uplink data transmission optionally followed by one downlink data transmission during the random access procedure.

EDT is triggered when the upper layers have requested the establishment or resumption of the RRC Connection for Mobile Originated data (i.e., not signalling or SMS) and the uplink data size is less than or equal to a TB size indicated in the system information. EDT is not used for data over the control plane when using the User Plane CIoT EPS optimizations.

EDT is only applicable to BL UEs, UEs in Enhanced Coverage and NB-IoT UEs.

According to the prior art, UE may transmit data in RRC_IDLE and/or RRC_INACTIVE. In this case, the UE may be configured with configured grant to transmit user data in RRC_IDLE and/or RRC_INACTIVE. However, the configured grant may be valid only when uplink timing is aligned with the network. That is, if the uplink timing is not aligned with the network, the configured grant cannot be used. It may be expected that the uplink timing with the network is not aligned as time goes. Therefore, it may be required to align uplink timing with the network continuously.

Figure 7:
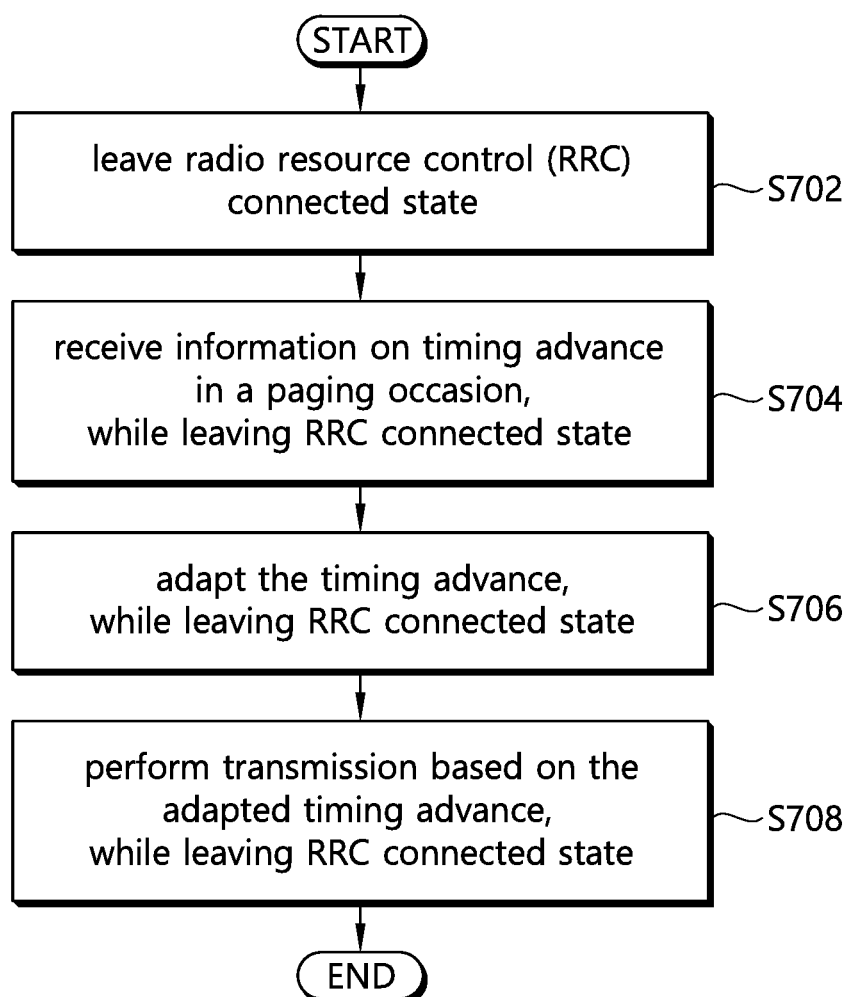
FIG. 7 shows a method for aligning timing advance according to an embodiment of the present disclosure.

FIG. 7 shows a method for aligning timing advance according to an embodiment of the present disclosure. In this embodiment, it may be assumed that the timing advance is maintained which the wireless device is staying in RRC idle or inactive state. Also, in this embodiment, the wireless device may communicate with at least one of a mobile terminal, a network or autonomous vehicles other than the wireless device.

In step S702, the wireless device may leave RRC connected state.

In step S704, the wireless device may receive information on timing advance in a paging occasion, while leaving RRC connected state. The paging occasion may correspond to the wireless device. It may be determined that the paging occasion corresponds to the wireless device based on a user equipment (UE) identity (ID) included on the information. The information may inform that the timing advance is maintained.

In step S706, the wireless device may adapt the timing advance, while leaving RRC connected state.

In step S708, the wireless device may perform transmission based on the adapted timing advance, while leaving RRC connected state. The transmission may be performed based on a configured grant.

Further, the wireless device may start a timer related to the timing advance. Further, the wireless device may initiate random access procedure upon expiry of the timer. Further, the wireless device may deactivate a configured grant upon expiry of the timer. Further, the wireless device may transmit a confirmation message for the information on the timing advance.

According to embodiments of the present disclosure, the wireless device may utilize previous configured grant continuously, by updating timing advance in RRC idle or RRC inactive state. In other words, the wireless device may continuously align the uplink timing with the network based on Timing Advance Command received periodically via Paging. Therefore, the configured grant can be used continuously, and data transmission with the configured grant can be continued as well. Further, it may reduce the power consumption by configuring new configured grant, because new configured grant is not needed.

Figure 8:
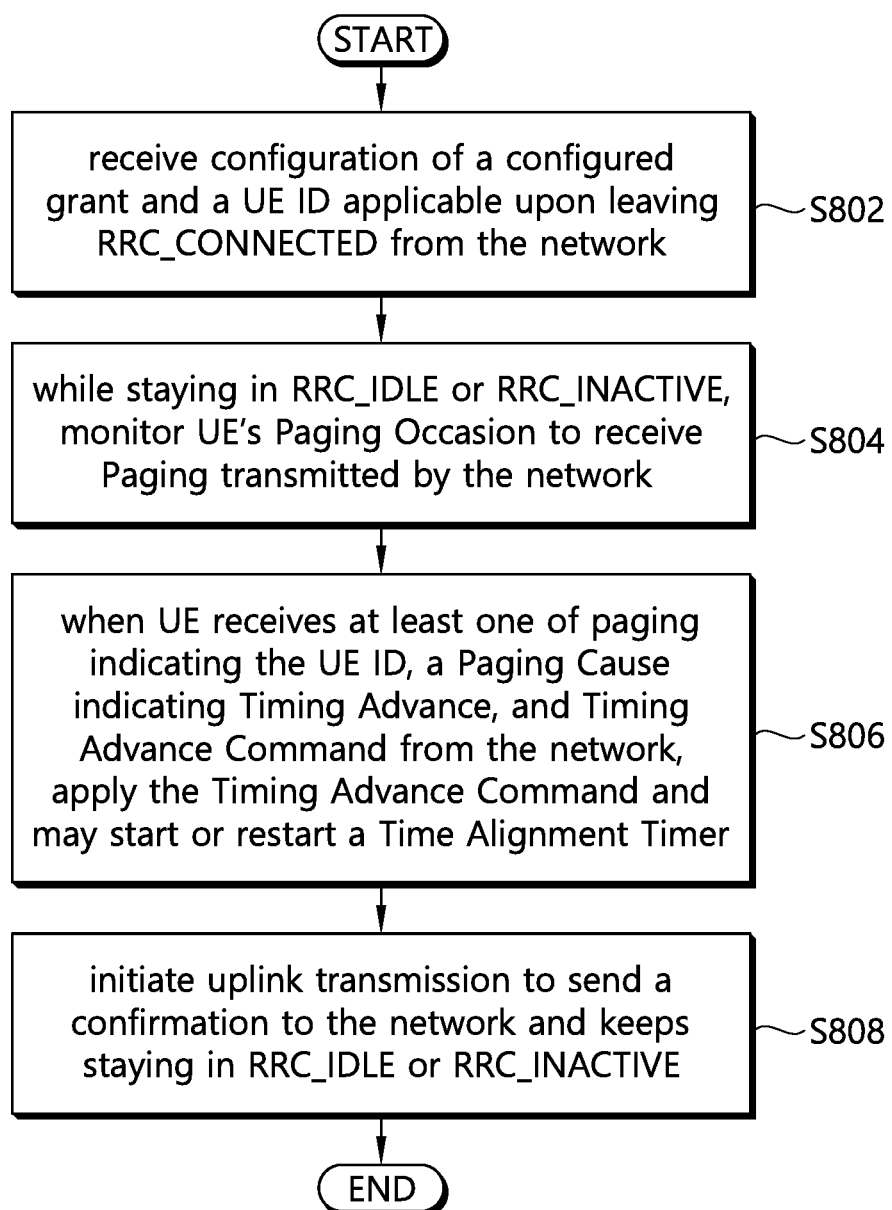
FIG. 8 shows an example of aligning timing advance according to an embodiment of the present disclosure.

FIG. 8 shows an example of aligning timing advance according to an embodiment of the present disclosure. In this embodiment, UE may be not only a terminal device, but also any type of device operating as wireless device, for example, an integrated access backhaul (IAB) node. Also, in this embodiment, it may be assumed that the timing advance is maintained which the UE is staying in RRC idle or inactive state.

In step S802, the UE may receive configuration of a configured grant and a UE ID applicable upon leaving RRC_CONNECTED from the network. The configured grant may be a resource of a Semi-Persistent Scheduling configuration. The UE ID may be SPS-I-RNTI. The configuration may also include a validity timer associated with the configured grant.

In step S804, while staying in RRC_IDLE or RRC_INACTIVE, the UE monitors UE's Paging Occasion to receive Paging transmitted by the network.

In step S806, when UE receives at least one of paging indicating the UE ID, a Paging Cause indicating Timing Advance, and Timing Advance Command from the network, the UE may apply the Timing Advance Command and may start or restart a Time Alignment Timer. The Paging may be a Paging message or a Indication included in Downlink Control Information of the PDCCH. The Timing Advance Command may indicate a Timing Advance value which UE should apply. The Paging may also indicate a RACH preamble resource such as RAPID and/or time/frequency resource.

In step S808, the UE may initiate uplink transmission to send a confirmation to the network and keeps staying in RRC_IDLE or RRC_INACTIVE. The confirmation may be at least one of the RACH preamble resource, a RRC message or a MAC Control Element indicating the UE ID and confirmation of Timing Advance. The confirmation may be transmitted via RACH procedure or the configured grant. When the UE receives Paging indicating the UE ID (e.g. with a Paging Cause not indicating Timing Advance), the UE may initiate uplink transmission to enter RRC_CONNECTED.

According to embodiments of the present disclosure, the network may transmit Timing Advance Command periodically to the UE in RRC_IDLE and/or RRC_INACTIVE via Paging. The UE may continuously align the uplink timing with the network based on Timing Advance Command received periodically via Paging. Therefore, the configured grant can be used continuously, and data transmission with the configured grant can be continued as well.

Figure 9:
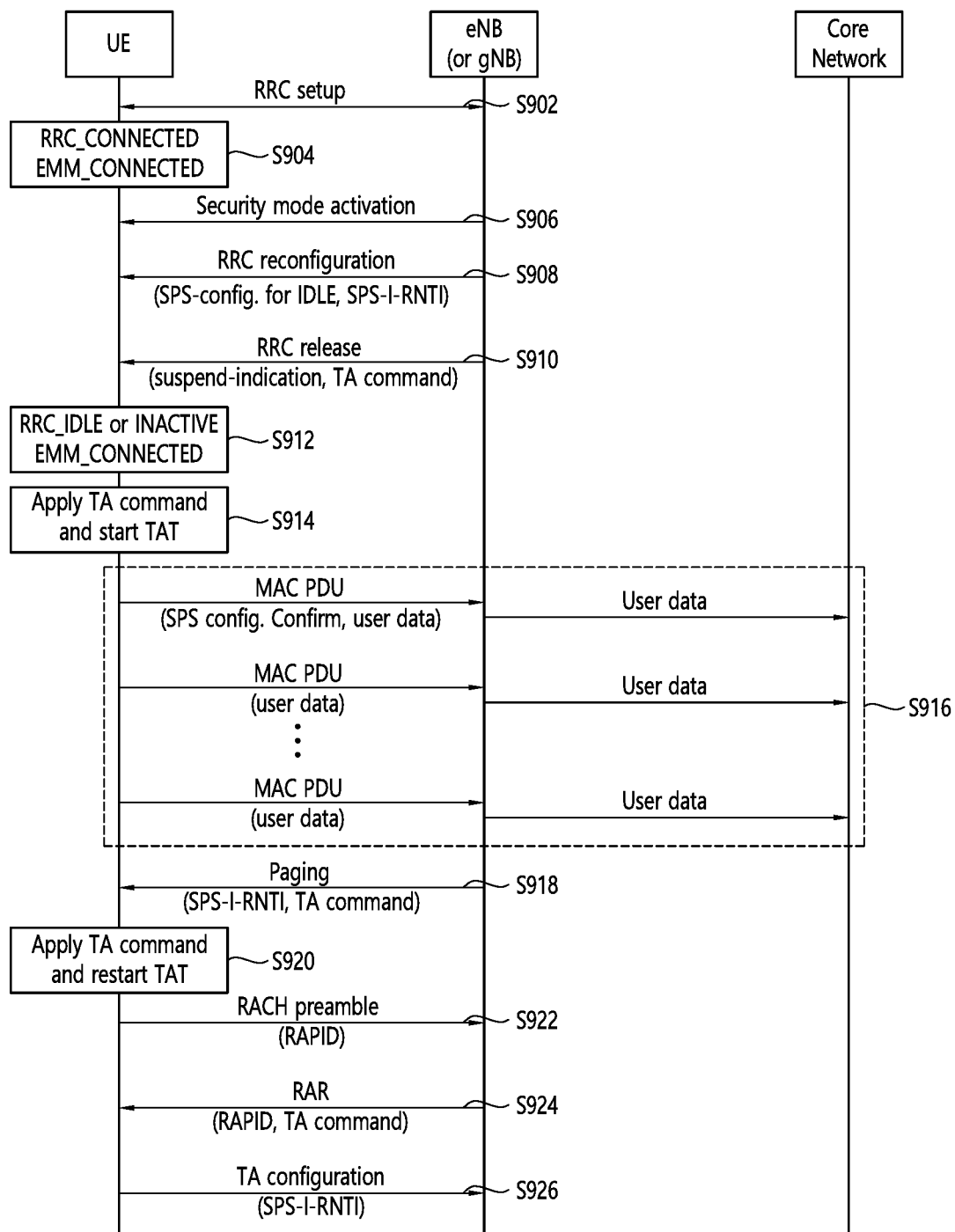
FIG. 9 shows an example of aligning timing advance according to an embodiment of the present disclosure.

FIG. 9 shows an example of aligning timing advance according to an embodiment of the present disclosure. In this embodiment, UE may be not only a terminal device, but also any type of device operating as wireless device, for example, an integrated access backhaul (IAB) node. Also, in this embodiment, it may be assumed that the timing advance is maintained which the UE is staying in RRC idle or inactive state.

In step S902, the UE and eNB may configure RRC setup.

In step S904, The UE may enter RRC_CONNECTED and EMM_CONNECTED at a serving cell.

In step S906, the UE may receive information on security mode activation. Then, the UE may perform Security Mode Activation to activate AS security based on the information.

In step S908, the UE may receive RRC connection reconfiguration message including to configure SPS configuration with SPS-I-RNTI which is used for data transmission in RRC_IDLE OR RRC_INACTIVE. UE may receive SPS configuration via system information regardless of RRC state.

The SPS configuration may includes at least one of uplink and/or downlink SPS resources as uplink and/or downlink configured grants, PRB or narrowband index, a validity area, a validity timer, valid logical channels, maximum amount of data (or maximum data rate) supported by the configured grant, and UE Identity such as a SPS-I-RNTI which is used by UE when UE performs uplink transmission with the configured grant. The SPS configured grant may be valid in the validity area consisting of one or more cells including the serving cell.

The SPS configuration or the SPS configured grant may be valid in the configured PRB or narrowband while UE is in RRC_IDLE OR RRC_INACTIVE. RRC Release or Paging or MAC Control Element or PDCCH received in RRC_IDLE OR RRC_INACTIVE may indicate SPS activation with a PRB index or a narrowband index for a particular SPS configured grant. Upon receiving such SPS activation with a PRB index or a narrowband index, the UE in RRC_IDLE OR RRC_INACTIVE may consider the SPS configured grant or the SPS configuration as activated on the PRB or the narrowband indicated by the index.

The SPS configured grant may be valid while the validity timer is running. The validity timer may be a timeAlignmentTimer (TAT) or another timer. The validity timer may be configured for each configured grant. The UE may start or restart the validity timer (e.g. TAT) when the SPS configured grant is received or when UE leaves RRC_CONNECTED or when Timing Advance Command is received e.g. via MAC Control Element, Random Access Response, RRC Release message, or Paging message in RRC_IDLE OR RRC_INACTIVE after leaving RRC_CONNECTED. The network may periodically send Timing Advance Command to UE in RRC_IDLE OR RRC_INACTIVE e.g. by Paging message in UE's Paging Occasion or MAC Control Element via DL SPS configured grant.

The SPS configured grant may be valid only for configured valid logical channels. Thus, only when UE transmits data from the valid logical channel, UE can use the SPS configured grant to transmit data.

In step S910, the UE may receive RRC Release message or RRC Release Indication (e.g. via PDCCH or MAC Control Element)

In step S912, upon receiving the RRC release message or RRC release indication, the UE may leave RRC_CONNECTED. The UE may go to RRC_IDLE OR RRC_INACTIVE.

When UE goes RRC_IDLE OR RRC_INACTIVE by receiving RRC Release, RRC Release may indicate downlink SPS activation for a particular SPS configured grant. Then, the UE may activate the downlink SPS configured grant. When data becomes available for downlink transmission in RRC_IDLE OR RRC_INACTIVE, the network may send user data by using the DL SPS configured grant. The network may indicate to UE that the DL SPS is deactivated by sending at least one of Paging, MAC Control Element or PDCCH to the UE in RRC_IDLE OR RRC_INACTIVE. Then, the UE may transmits DL data via the SPS configured grant.

When UE goes RRC_IDLE OR RRC_INACTIVE by receiving RRC Release, RRC Release may indicate downlink SPS deactivation for a particular SPS configured grant. Or, the network may indicate to UE that the DL SPS is deactivated by sending Paging, MAC Control Element or PDCCH to the UE in RRC_IDLE OR RRC_INACTIVE. In this case, the network may indicate to UE that the DL SPS is activated by sending Paging, MAC Control Element or PDCCH to the UE in RRC_IDLE OR RRC_INACTIVE. Then, the UE may transmit DL data via the SPS configured grant.

In step S914, when RRC Release indicates Timing Advance Command, the UE in RRC_IDLE OR RRC_INACTIVE may adapt the Timing Advance Command and start TAT.

In step S916, after that, the UE may transmit user data via the configured grant. If the RRC Release may indicate uplink SPS activation for a particular SPS configured grant, when data becomes available for uplink transmission in RRC_IDLE OR RRC_INACTIVE, the UE may construct a MAC PDU including SPS Confirmation MAC Control Element with user data. The SPS Confirmation MAC CE may indicate which SPS configured grant(s) is activated or deactivated. The UE may periodically transmit SPS Confirmation MAC CE to inform the network which SPS configured grant(s) is currently activated or deactivated.

Then, the UE in RRC_IDLE OR RRC_INACTIVE may perform uplink transmissions by using the SPS configured grant. The SPS configured grant may be either contention based or contention free. The UE in RRC_IDLE OR RRC_INACTIVE should transmit data with UE ID such as SPS-I-RNTI or S-TMSI in contention based SPS configured grant. The UE in RRC_IDLE OR RRC_INACTIVE may include UE ID in a RRC message or a MAC CE to be transmitted in uplink.

Before transmitting a MAC PDU by using contention based configured grant, the UE in RRC_IDLE OR RRC_INACTIVE may perform Access Barring Check to determine whether or not to perform transmission of the MAC PDU via the SPS configured grant based on barring information received from system information. If access attempt is allowed as the result of Access Barring Check, the UE may perform transmission of the MAC PDU.

The network may indicate to UE whether the SPS configured grant or the SPS configuration requires Access Barring Check. Thus, if indicated, the UE MAC entity may request UE RRC layer to perform Access Barring Check before transmission of the MAC PDU via the SPS configured grant. Then, the UE RRC entity may inform UE MAC entity about the result of the Access Barring Check. If access attempt is allowed as the result of Access Barring Check, the UE MAC entity may perform transmission of the MAC PDU.

If the UE in RRC_IDLE OR RRC_INACTIVE should transmit a MAC PDU with UE ID such as SPS-I-RNTI or S-TMSI in contention based SPS configured grant, the UE MAC entity may consider transmission of the MAC PDU as successful after contention resolution message as well as positive HARQ feedback is received in downlink.

Meanwhile, the UE in RRC_IDLE OR RRC_INACTIVE may transmit data without UE ID in contention free SPS configured grant. The UE may not need to perform Access Barring Check before transmitting MAC PDU by using contention free SPS configured grant. In this case, the UE MAC entity may consider transmission of the MAC PDU as successful after positive HARQ feedback is received in downlink without contention resolution message.

In step S918, the UE may receive paging from the network. The UE may monitor Paging Occasion specific to the UE. If UE receives at least one of Paging indicating the UE ID, a Paging Cause indicating Timing Advance, and Timing Advance Command from the network, the UE may apply the Timing Advance Command and may start or restart a Time Alignment Timer. The Paging may be a Paging message or an Indication included in Downlink Control Information of the PDCCH Timing Advance Command may indicate a Timing Advance value which UE should apply. The Paging may also indicate a RACH preamble resource such as RAPID and/or time/frequency resource.

In step S920, the UE may apply TA command and restart TAT.

In step S922, upon receiving the Paging, the UE may initiate uplink transmission to send a confirmation to the network. However, the UE may keep staying in RRC_IDLE OR RRC_INACTIVE. The confirmation may be at least one of the RACH preamble resource, a RRC message or a MAC Control Element indicating the UE ID and confirmation of Timing Advance. The confirmation may be transmitted via a RACH procedure or the configured grant.

In addition, upon receiving a Paging indicating UL or DL SPS activation with the UE ID and Paging Cause indicating SPS activation, the UE may activate the SPS. Note that when UE receives Paging indicating the UE ID for other purpose (e.g. with a Paging Cause not indicating Timing Advance), the UE may initiate uplink transmission to enter RRC_CONNECTED.

When the TAT expires, or when the validity timer expires, or when UE leaves the validity area, or when data becomes available for a logical channel not mapped to the SPS configuration or the SPS configured grant, or when data becomes available and the amount of data available for transmission is beyond the maximum amount of data (or the maximum data rate), the UE may initiate Random Access procedure to perform EDT procedure or RRC Connection Establishment or RRC Resume procedure. So, the UE may transmit RACH preamble with a RAPID. In addition, the UE may deactivate the corresponding SPS configured grant or suspend the SPS configuration or release the SPS configuration. The RAPID may be associated with the SPS configuration or the SPS configured grant.

In step S924, in response to the RACH preamble, the network may send Random Access Response (RAR) message to the UE. The RAR message may include RAPID, Time Advance command, and SPS-I-RNTI. In addition, the RAR message may indicate which type of message 3 UE should send (e.g. EarlyDataRequest, RRCConnectionRequest or RRCResumeRequest) or which procedure UE should trigger for message 3 (e.g. EDT, RRC Connection Establishment or RRC Resume procedure).

In step S926, based on the RAR message, the UE may transmit message 3, e.g. one of EarlyDataRequest, RRCConnectionRequest or RRCResumeRequest, possibly with user data. In message 4, the UE may receive SPS reconfiguration and new SPS-I-RNTI. If UE enters RRC_CONNECTED after receiving message 4, the UE may transmit user data in RRC_CONNECTED.

According to embodiments of the present disclosure, the UE may utilize previous configured grant continuously, by updating timing advance in RRC idle or RRC inactive state. In other words, the UE may continuously align the uplink timing with the network based on Timing Advance Command received periodically via Paging. Therefore, the configured grant can be used continuously, and data transmission with the configured grant can be continued as well. Further, it may reduce the power consumption by configuring new configured grant, because new configured grant is not needed.

Figure 10:
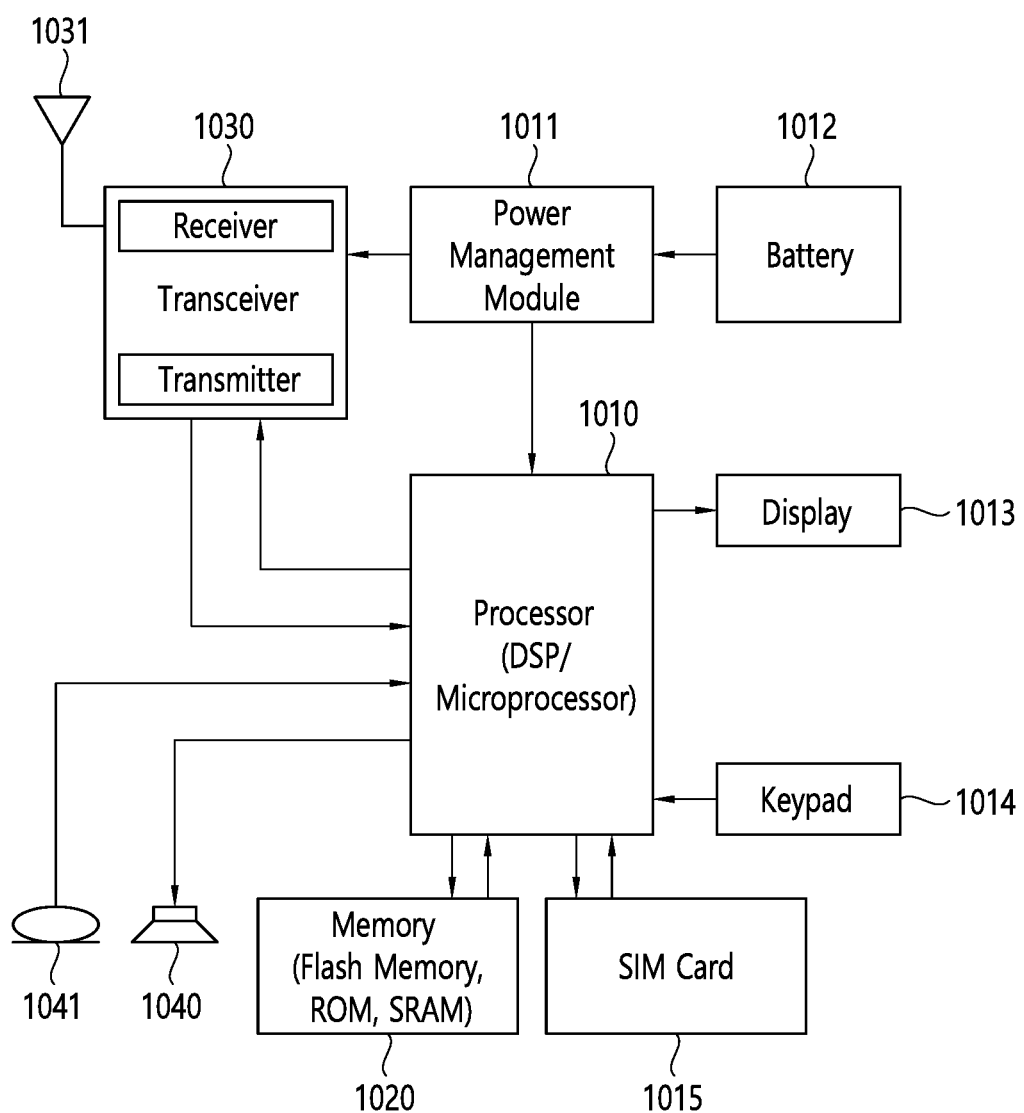
FIG. 10 shows more detailed wireless device to implement an embodiment of the present disclosure.

FIG. 10 shows more detailed wireless device to implement an embodiment of the present disclosure. The present disclosure described above for wireless device side may be applied to this embodiment.

A wireless device includes a processor 1010, a power management module 1011, a battery 1012, a display 1013, a keypad 1014, a subscriber identification module (SIM) card 1015, a memory 1020, a transceiver 1030, one or more antennas 1031, a speaker 1040, and a microphone 1041.

The processor 1010 may be configured to implement proposed functions, procedures and/or methods described in this description. Layers of the radio interface protocol may be implemented in the processor 1010. The processor 1010 may include ASIC, other chipset, logic circuit and/or data processing device. The processor 1010 may be an application processor (AP). The processor 1010 may include at least one of a digital signal processor (DSP), a central processing unit (CPU), a graphics processing unit (GPU), a modem (modulator and demodulator). An example of the processor 1010 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

According to an embodiment of the present disclosure, the processor 1010 may be configured to leave RRC connected state.

The processor 1010 may be configured to receive information on timing advance in a paging occasion, while leaving RRC connected state. The paging occasion may correspond to the wireless device. It may be determined that the paging occasion corresponds to the wireless device based on a user equipment (UE) identity (ID) included on the information. The information may inform that the timing advance is maintained.

The processor 1010 may be configured to adapt the timing advance, while leaving RRC connected state.

The processor 1010 may be configured to perform transmission based on the adapted timing advance, while leaving RRC connected state. The transmission may be performed based on a configured grant.

Further, the processor 1010 may be configured to start a timer related to the timing advance. Further, the processor 1010 may be configured to initiate random access procedure upon expiry of the timer. Further, the processor 1010 may be configured to deactivate a configured grant upon expiry of the timer. Further, the processor 1010 may be configured to transmit a confirmation message for the information on the timing advance.

According to embodiments of the present disclosure, the wireless device may utilize previous configured grant continuously, by updating timing advance in RRC idle or RRC inactive state. In other words, the wireless device may continuously align the uplink timing with the network based on Timing Advance Command received periodically via Paging. Therefore, the configured grant can be used continuously, and data transmission with the configured grant can be continued as well. Further, it may reduce the power consumption by configuring new configured grant, because new configured grant is not needed.

The power management module 1011 manages power for the processor 1010 and/or the transceiver 1030. The battery 1012 supplies power to the power management module 1011. The display 1013 outputs results processed by the processor 1010. The keypad 1014 receives inputs to be used by the processor 1010. The keypad 1014 may be shown on the display 1013. The SIM card 1015 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 1020 is operatively coupled with the processor 1010 and stores a variety of information to operate the processor 1010. The memory 1020 may include ROM, RAM, flash memory, memory card, storage medium and/or other storage device. When the embodiments are implemented in software, the techniques described herein can be implemented with modules (e.g., procedures, functions, and so on) that perform the functions described herein. The modules can be stored in the memory 1020 and executed by the processor 1010. The memory 1020 can be implemented within the processor 1010 or external to the processor 1010 in which case those can be communicatively coupled to the processor 1010 via various means as is known in the art.

The transceiver 1030 is operatively coupled with the processor 1010, and transmits and/or receives a radio signal. The transceiver 1030 includes a transmitter and a receiver. The transceiver 1030 may include baseband circuitry to process radio frequency signals. The transceiver 1030 controls the one or more antennas 1031 to transmit and/or receive a radio signal.

The speaker 1040 outputs sound-related results processed by the processor 1010. The microphone 1041 receives sound-related inputs to be used by the processor 1010.

The embodiments of the disclosure may be applied to various future technologies, such as AI, robots, autonomous-driving/self-driving vehicles, and/or extended reality (XR).

AI refers to artificial intelligence and/or the field of studying methodology for making it. Machine learning is a field of studying methodologies that define and solve various problems dealt with in AI. Machine learning may be defined as an algorithm that enhances the performance of a task through a steady experience with any task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value. An ANN may include an input layer, an output layer, and optionally one or more hidden layers. Each layer may contain one or more neurons, and an ANN may include a synapse that links neurons to neurons. In an ANN, each neuron can output a summation of the activation function for input signals, weights, and deflections input through the synapse. Model parameters are parameters determined through learning, including deflection of neurons and/or weights of synaptic connections. The hyper-parameter means a parameter to be set in the machine learning algorithm before learning, and includes a learning rate, a repetition number, a mini batch size, an initialization function, etc. The objective of the ANN learning can be seen as determining the model parameters that minimize the loss function. The loss function can be used as an index to determine optimal model parameters in learning process of ANN.

Machine learning can be divided into supervised learning, unsupervised learning, and reinforcement learning, depending on the learning method. Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

A robot can mean a machine that automatically processes or operates a given task by its own abilities. In particular, a robot having a function of recognizing the environment and performing self-determination and operation can be referred to as an intelligent robot. Robots can be classified into industrial, medical, household, military, etc., depending on the purpose and field of use. The robot may include a driving unit including an actuator and/or a motor to perform various physical operations such as moving a robot joint. In addition, the movable robot may include a wheel, a break, a propeller, etc., in a driving unit, and can travel on the ground or fly in the air through the driving unit.

The autonomous-driving refers to a technique of self-driving, and an autonomous vehicle refers to a vehicle that travels without a user's operation or with a minimum operation of a user. For example, autonomous-driving may include techniques for maintaining a lane while driving, techniques for automatically controlling speed such as adaptive cruise control, techniques for automatically traveling along a predetermined route, and techniques for traveling by setting a route automatically when a destination is set. The autonomous vehicle may include a vehicle having only an internal combustion engine, a hybrid vehicle having an internal combustion engine and an electric motor together, and an electric vehicle having only an electric motor, and may include not only an automobile but also a train, a motorcycle, etc. The autonomous vehicle can be regarded as a robot having an autonomous driving function.

XR are collectively referred to as VR, AR, and MR. VR technology provides real-world objects and/or backgrounds only as computer graphic (CG) images, AR technology provides CG images that is virtually created on real object images, and MR technology is a computer graphics technology that mixes and combines virtual objects in the real world. MR technology is similar to AR technology in that it shows real and virtual objects together. However, in the AR technology, the virtual object is used as a complement to the real object, whereas in the MR technology, the virtual object and the real object are used in an equal manner. XR technology can be applied to HMD, head-up display (HUD), mobile phone, tablet PC, laptop, desktop, TV, digital signage. A device to which the XR technology is applied may be referred to as an XR device.

Figure 11:
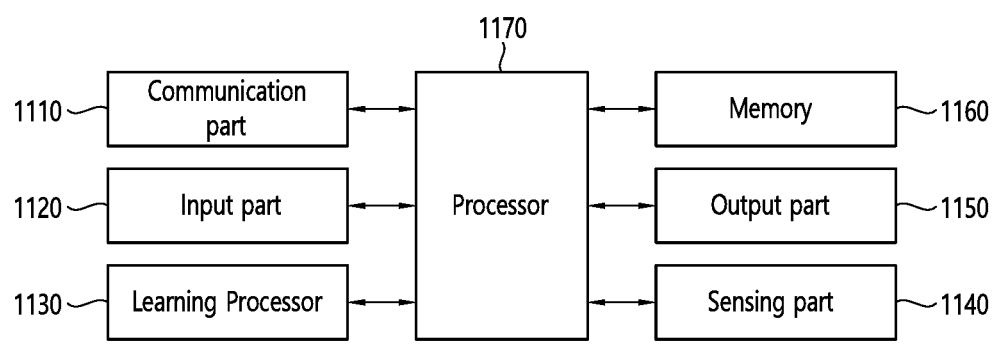
FIG. 11 shows an example of an AI device to which the technical features of the present disclosure can be applied.

FIG. 11 shows an example of an AI device to which the technical features of the disclosure can be applied.

The AI device 1100 may be implemented as a stationary device or a mobile device, such as a TV, a projector, a mobile phone, a smartphone, a desktop computer, a notebook, a digital broadcasting terminal, a PDA, a PMP, a navigation device, a tablet PC, a wearable device, a set-top box (STB), a digital multimedia broadcasting (DMB) receiver, a radio, a washing machine, a refrigerator, a digital signage, a robot, a vehicle, etc.

Referring to FIG. 11, the AI device 1100 may include a communication part 1110, an input part 1120, a learning processor 1130, a sensing part 1140, an output part 1150, a memory 1160, and a processor 1170.

The communication part 1110 can transmit and/or receive data to and/or from external devices such as the AI devices and the AI server using wire and/or wireless communication technology. For example, the communication part 1110 can transmit and/or receive sensor information, a user input, a learning model, and a control signal with external devices. The communication technology used by the communication part 1110 may include a global system for mobile communication (GSM), a code division multiple access (CDMA), an LTE/LTE-A, a 5G, a WLAN, a Wi-Fi, Bluetooth™, radio frequency identification (RFID), infrared data association (IrDA), ZigBee, and/or near field communication (NFC).

The input part 1120 can acquire various kinds of data. The input part 1120 may include a camera for inputting a video signal, a microphone for receiving an audio signal, and a user input part for receiving information from a user. A camera and/or a microphone may be treated as a sensor, and a signal obtained from a camera and/or a microphone may be referred to as sensing data and/or sensor information. The input part 1120 can acquire input data to be used when acquiring an output using learning data and a learning model for model learning. The input part 1120 may obtain raw input data, in which case the processor 1170 or the learning processor 1130 may extract input features by preprocessing the input data.

The learning processor 1130 may learn a model composed of an ANN using learning data. The learned ANN can be referred to as a learning model. The learning model can be used to infer result values for new input data rather than learning data, and the inferred values can be used as a basis for determining which actions to perform. The learning processor 1130 may perform AI processing together with the learning processor of the AI server. The learning processor 1130 may include a memory integrated and/or implemented in the AI device 1100. Alternatively, the learning processor 1130 may be implemented using the memory 1160, an external memory directly coupled to the AI device 1100, and/or a memory maintained in an external device.

The sensing part 1140 may acquire at least one of internal information of the AI device 1100, environment information of the AI device 1100, and/or the user information using various sensors. The sensors included in the sensing part 1140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a light detection and ranging (LIDAR), and/or a radar.

The output part 1150 may generate an output related to visual, auditory, tactile, etc. The output part 1150 may include a display unit for outputting visual information, a speaker for outputting auditory information, and/or a haptic module for outputting tactile information.

The memory 1160 may store data that supports various functions of the AI device 1100. For example, the memory 1160 may store input data acquired by the input part 1120, learning data, a learning model, a learning history, etc.

The processor 1170 may determine at least one executable operation of the AI device 1100 based on information determined and/or generated using a data analysis algorithm and/or a machine learning algorithm. The processor 1170 may then control the components of the AI device 1100 to perform the determined operation. The processor 1170 may request, retrieve, receive, and/or utilize data in the learning processor 1130 and/or the memory 1160, and may control the components of the AI device 1100 to execute the predicted operation and/or the operation determined to be desirable among the at least one executable operation. The processor 1170 may generate a control signal for controlling the external device, and may transmit the generated control signal to the external device, when the external device needs to be linked to perform the determined operation. The processor 1170 may obtain the intention information for the user input and determine the user's requirements based on the obtained intention information. The processor 1170 may use at least one of a speech-to-text (STT) engine for converting speech input into a text string and/or a natural language processing (NLP) engine for acquiring intention information of a natural language, to obtain the intention information corresponding to the user input. At least one of the STT engine and/or the NLP engine may be configured as an ANN, at least a part of which is learned according to a machine learning algorithm. At least one of the STT engine and/or the NLP engine may be learned by the learning processor 1130 and/or learned by the learning processor of the AI server, and/or learned by their distributed processing. The processor 1170 may collect history information including the operation contents of the AI device 1100 and/or the user's feedback on the operation, etc. The processor 1170 may store the collected history information in the memory 1160 and/or the learning processor 1130, and/or transmit to an external device such as the AI server. The collected history information can be used to update the learning model. The processor 1170 may control at least some of the components of AI device 1100 to drive an application program stored in memory 1160. Furthermore, the processor 1170 may operate two or more of the components included in the AI device 1100 in combination with each other for driving the application program.

Figure 12:
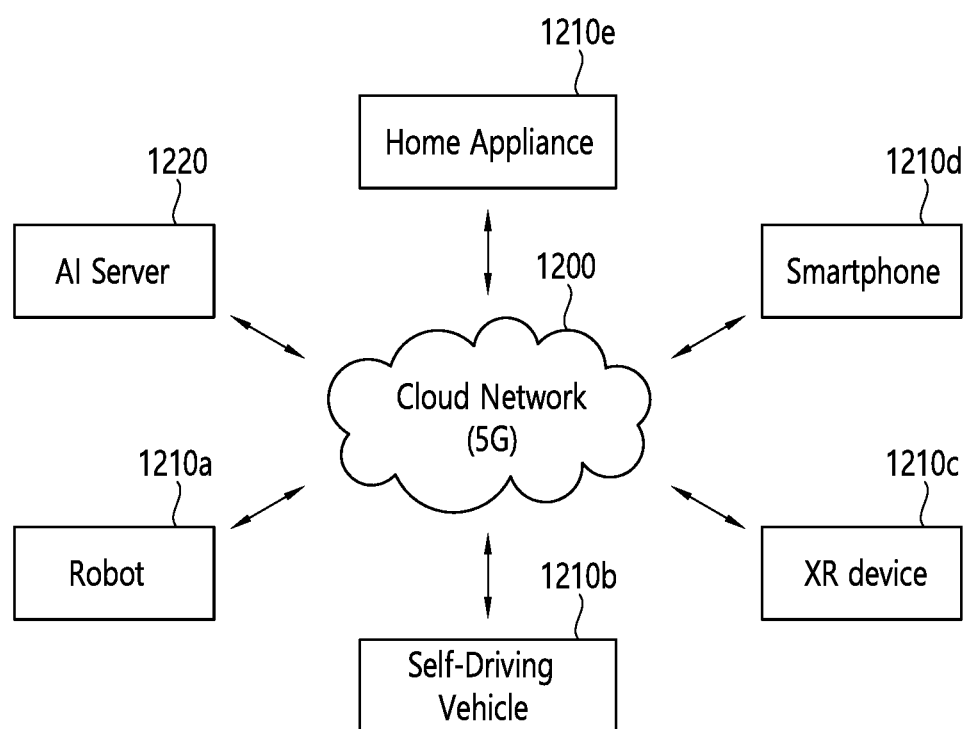
FIG. 12 shows an example of an AI system to which the technical features of the present disclosure can be applied.

FIG. 12 shows an example of an AI system to which the technical features of the present disclosure can be applied.

Referring to FIG. 12, in the AI system, at least one of an AI server 1220, a robot 1210*a*, an autonomous vehicle 1210*b*, an XR device 1210*c*, a smartphone 1210*d* and/or a home appliance 1210*e* is connected to a cloud network 1200. The robot 1210*a*, the autonomous vehicle 1210*b*, the XR device 1210*c*, the smartphone 1210*d*, and/or the home appliance 1210*e* to which the AI technology is applied may be referred to as AI devices 1210*a* to 1210*e*.

The cloud network 1200 may refer to a network that forms part of a cloud computing infrastructure and/or resides in a cloud computing infrastructure. The cloud network 1200 may be configured using a 3G network, a 4G or LTE network, and/or a 5G network. That is, each of the devices 1210*a* to 1210*e* and 1220 consisting the AI system may be connected to each other through the cloud network 1200. In particular, each of the devices 1210*a* to 1210*e* and 1220 may communicate with each other through a base station, but may directly communicate with each other without using a base station.

The AI server 1220 may include a server for performing AI processing and a server for performing operations on big data. The AI server 1220 is connected to at least one or more of AI devices constituting the AI system, i.e. the robot 1210*a*, the autonomous vehicle 1210*b*, the XR device 1210*c*, the smartphone 1210*d* and/or the home appliance 1210*e* through the cloud network 1200, and may assist at least some AI processing of the connected AI devices 1210*a* to 1210*e*. The AI server 1220 can learn the ANN according to the machine learning algorithm on behalf of the AI devices 1210*a* to 1210*e*, and can directly store the learning models and/or transmit them to the AI devices 1210*a* to 1210*e*. The AI server 1220 may receive the input data from the AI devices 1210*a* to 1210*e*, infer the result value with respect to the received input data using the learning model, generate a response and/or a control command based on the inferred result value, and transmit the generated data to the AI devices 1210*a* to 1210*e*. Alternatively, the AI devices 1210*a* to 1210*e* may directly infer a result value for the input data using a learning model, and generate a response and/or a control command based on the inferred result value.

Various embodiments of the AI devices 1210*a* to 1210*e* to which the technical features of the present disclosure can be applied will be described. The AI devices 1210*a* to 1210*e* shown in FIG. 12 can be seen as specific embodiments of the AI device 1100 shown in FIG. 11.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

The invention claimed is:

1. A method performed by a wireless device adapted to operate in a wireless communication system, the method comprising:

receiving a radio resource control (RRC) release message from a network,
wherein the RRC release message includes i) a time alignment timer value for a configured grant-based small data transmission, ii) information for a configured grant resource, and iii) information for a valid logical channel, and
wherein the configured grant-based small data transmission is a procedure allowing data transmission over the configured grant resource while remaining in an RRC inactive state without transitioning to an RRC connected state;
upon reception of the RRC release message:
i) entering the RRC inactive state; and
ii) starting a time alignment timer based on the time alignment timer value;
considering the time alignment timer to be valid while the time alignment timer is running; and performing the configured grant-based small data transmission over the configured grant resource based on the time alignment timer being valid,
wherein the configured grant-based small data transmission includes transmission of data from the valid logical channel which can only be mapped to the configured grant resource.

2. The method of claim 1, further comprising:
initiating a random access procedure upon expiration of the time alignment timer.

3. The method of claim 1, further comprising:
deactivating the configured grant resource upon expiration of the time alignment timer.

4. The method of claim 1, wherein the wireless device communicates with at least one of a mobile terminal, a network or autonomous vehicles other than the wireless device.

5. The method of claim 1, wherein the configured grant resource is only valid in a serving cell.

6. The method of claim 1, further comprising:
receiving, from the network, a configuration for the configured grant resource which includes information related to uplink resources for the configured grant resource and a user equipment (UE) identity for the configured grant-based small data transmission.

7. A wireless device adapted to operate in a wireless communication system, the wireless device comprising:
at least one transceiver;
at least one processor; and
at least one computer memory operably connectable to the at least one processor and storing instructions that, based on being executed by the at least one processor, performs operations comprising:
receiving, via the at least one transceiver, a radio resource control (RRC) release message from a network,
wherein the RRC release message includes i) a time alignment timer value for a configured grant-based small data transmission, ii) information for a configured grant resource, and iii) information for a valid logical channel, and
wherein the configured grant-based small data transmission is a procedure allowing data transmission over the configured grant resource while remaining in an RRC inactive state without transitioning to an RRC connected state;
upon reception of the RRC release message:
i) entering the RRC inactive state; and
ii) starting a time alignment timer based on the time alignment timer value;
considering the time alignment timer to be valid while the time alignment timer is running; and
performing, via the at least one transceiver, the configured grant-based small data transmission over the configured grant resource based on the time alignment timer being valid,
wherein the configured grant-based small data transmission includes transmission of data from the valid logical channel which can only be mapped to the configured grant resource.

8. The wireless device of claim 7, wherein the operations further comprise initiating a random access procedure upon expiration of the time alignment timer.

9. The wireless device of claim 7, wherein the operations further comprise deactivating the configured grant resource upon expiration of the time alignment timer.

10. The wireless device of claim 7, wherein the configured grant resource is only valid in a serving cell.

11. The wireless device of claim 7, wherein the operations further comprise receiving, from the network, a configuration for the configured grant resource which includes information related to uplink resources for the configured grant resource and a user equipment (UE) identity for the configured grant-based small data transmission.

12. A processing apparatus adapted to control a wireless device in a wireless communication system, the processing apparatus comprising:
at least one memory; and
at least one processor, operatively coupled to the at least one memory, and configured to perform operations comprising:
obtaining a radio resource control (RRC) release message,
wherein the RRC release message includes i) a time alignment timer value for a configured grant-based small data transmission, ii) information for a configured grant resource, and iii) information for a valid logical channel, and
wherein the configured grant-based small data transmission is a procedure allowing data transmission over the configured grant resource while remaining in an RRC inactive state without transitioning to an RRC connected state;
upon reception of the RRC release message:
i) entering the RRC inactive state; and
ii) starting a time alignment timer based on the time alignment timer value;
considering the time alignment timer to be valid while the time alignment timer is running; and
controlling the wireless device to perform the configured grant-based small data transmission over the configured grant resource based on the time alignment timer being valid,
wherein the configured grant-based small data transmission includes transmission of data from the valid logical channel which can only be mapped to the configured grant resource.

13. The processing apparatus of claim 12, wherein the operations further comprise initiating a random access procedure upon expiration of the time alignment timer.

14. The processing apparatus of claim 12, wherein the operations further comprise deactivating the configured grant resource upon expiration of the time alignment timer.

15. The processing apparatus of claim 12, wherein the configured grant resource is only valid in a serving cell.

16. The processing apparatus of claim 12, wherein the operations further comprise obtaining a configuration for the configured grant resource which includes information related to uplink resources for the configured grant resource and a user equipment (UE) identity for the configured grant-based small data transmission.

* * * * *